(12) United States Patent
Yang

(10) Patent No.: US 8,985,256 B1
(45) Date of Patent: Mar. 24, 2015

(54) HOOD APPARATUS FOR VEHICLE

(71) Applicant: Hyundai Motor Company, Seoul (KR)

(72) Inventor: Seung Jun Yang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/097,061

(22) Filed: Dec. 4, 2013

(30) Foreign Application Priority Data

Sep. 4, 2013 (KR) .................. 10-2013-0106332

(51) Int. Cl.
*B60T 7/12* (2006.01)
*B60R 21/38* (2011.01)

(52) U.S. Cl.
CPC .................. *B60R 21/38* (2013.01)
USPC .................. 180/274; 180/286

(58) Field of Classification Search
CPC .................. B60R 21/38
USPC .................. 180/274, 286
See application file for complete search history.

(56) References Cited

U.S. PATENT DOCUMENTS

| | | | |
|---|---|---|---|
| 6,439,330 B1 * | 8/2002 | Paye ..................... | 180/69.21 |
| 7,712,569 B2 * | 5/2010 | Scheuch et al. ............ | 180/274 |
| 7,896,122 B2 * | 3/2011 | Borg et al. ................. | 180/274 |
| 7,913,795 B2 * | 3/2011 | Borg et al. ................. | 180/274 |
| 2009/0048734 A1 * | 2/2009 | Iwai et al. ............... | 701/36 |
| 2009/0084620 A1 * | 4/2009 | Matsuura et al. .......... | 180/69.2 |
| 2009/0223360 A1 * | 9/2009 | Aoki et al. ................ | 92/15 |
| 2009/0266638 A1 * | 10/2009 | Hayashi et al. ........... | 180/274 |
| 2010/0024162 A1 * | 2/2010 | Walz ........................ | 16/233 |
| 2010/0244484 A1 * | 9/2010 | Nakaura et al. .......... | 296/187.04 |
| 2010/0263957 A1 * | 10/2010 | Shaw ...................... | 180/281 |
| 2014/0132036 A1 * | 5/2014 | Fritzon .................... | 296/193.11 |

FOREIGN PATENT DOCUMENTS

| | | | |
|---|---|---|---|
| DE | 102008011468 A1 * | 9/2008 | ......... B60R 21/34 |
| JP | 11-310158 A | 11/1999 | |
| JP | 2006-290287 A | 10/2006 | |
| JP | 2007-515326 A | 6/2007 | |
| KR | 10-2008-0017455 A | 2/2008 | |
| WO | WO 2011092422 A1 * | 8/2011 | |

* cited by examiner

*Primary Examiner* — Karen Beck
(74) *Attorney, Agent, or Firm* — Morgan, Lewis & Bockius LLP

(57) ABSTRACT

DA hood apparatus for a vehicle includes a hinge arm having on a lower end thereof a first hinge shaft is coupled. An articulated link is coupled at a first end thereof to the hinge arm via the first hinge shaft and coupled at a second end thereof to a vehicle body via a second hinge shaft, and includes a plurality of joints formed by hingedly coupling a plurality of link aims, thus allowing the link arms to be operated by respective hinge shafts. An actuator is coupled at a first end thereof to the second hinge shaft and coupled at a second end thereof to an associated link arm of the articulated link, so that, in the event of a forward collision of the vehicle, the actuator is triggered to allow the hood to pop up.

11 Claims, 4 Drawing Sheets

STRIKER

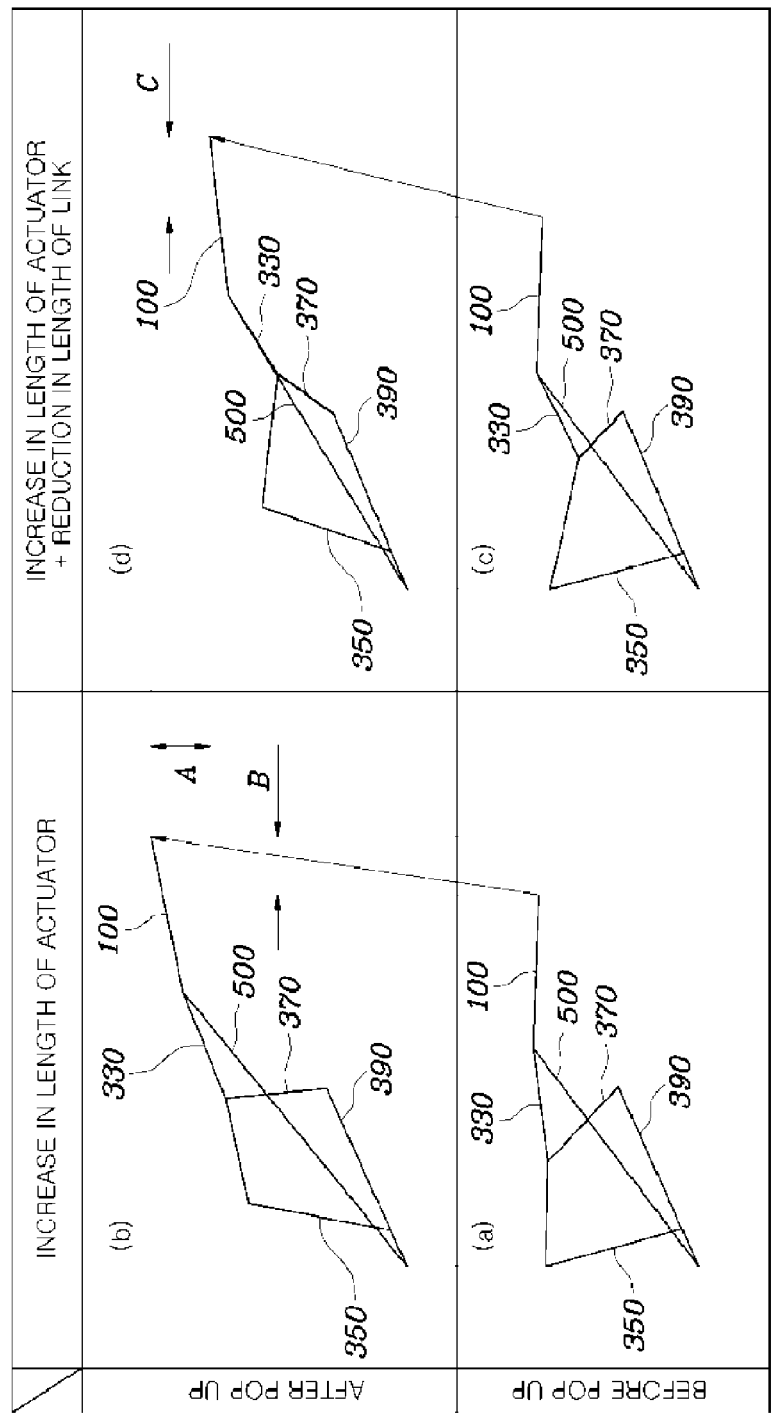

HOOD APPARATUS FOR VEHICLE

CROSS-REFERENCE TO RELATED APPLICATION

The present application claims priority of Korean Patent Application Number 10-2013-0106332 filed Sep. 4, 2013, the entire contents of which application is incorporated herein for all purposes by this reference.

BACKGROUND OF INVENTION

1. Field of Invention

The present invention relates to a hood apparatus for a vehicle which is capable of reducing injury to a pedestrian in the event of a forward collision with the pedestrian, which may occur when a vehicle is being driven.

2. Description of Related Art

While a vehicle is being driven, a collision between the vehicle and a pedestrian situated in front of the vehicle may unintentionally occur. In this case, the pedestrian's head collides with rigid body parts mounted to the front of the vehicle, namely, the wiper pivot, the lower portion of the windshield glass, the sealer matching part of the cowl panel, etc., so that the pedestrian may be seriously injured.

Hence, conventionally, a method of popping up a vehicle hood and deploying an airbag installed in a radiator grill was used to protect a pedestrian from serious injury when a collision between the vehicle and a pedestrian occurs. However, the conventional method is problematic in that the structure is complicated and manufacturing cost is increased.

Japanese Laid-Open Patent JP 2006-290287A, which is entitled "Hood Apparatus for Vehicle", has proposed an apparatus for popping up a vehicle hood. This is low in manufacturing cost, but has a problem in that a pedestrian is not sufficiently protected.

Therefore, there is a need for a hood apparatus for a vehicle, which can sufficiently protect a pedestrian from serious injury when a collision may occur between the vehicle and the pedestrian, and which has a simple structure, thus reducing manufacturing cost.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and the present invention is intended to propose a hood apparatus for a vehicle, which can sufficiently protect a pedestrian from a serious injury when a collision may occur between the vehicle and a pedestrian, and which has a simple structure, thus reducing manufacturing cost.

In order to achieve the above object, according to one aspect Various aspects of the present invention provide for a hood apparatus for a vehicle, including a vehicle hood with which a hinge arm having on a lower end thereof a first hinge shaft is coupled; an articulated link coupled at a first end thereof to the hinge arm via the first hinge shaft, and coupled at a second end thereof to a vehicle body via a second hinge shaft, and comprising a plurality of joints formed by hingedly coupling a plurality of link arms, thus allowing the link arms to be operated by respective hinge shafts; and an actuator coupled at a first end thereof to the second hinge shaft and coupled at a second end thereof to an associated link arm of the articulated link, so that, in the event of a forward collision of the vehicle, the actuator is triggered to allow the hood to pop up.

In the event of the collision, the hood may pop up to an upper position of the vehicle by the actuator while simultaneously moving to a rear position of the vehicle.

The articulated link may include a plate-shaped main link arm, and a first subsidiary link arm, a second subsidiary link arm and a third subsidiary link arm which each have a shape of a plate and have a length shorter than that of the main link arm.

A first end of the main link aim may be hingedly coupled to the hinge arm by the first hinge shaft, and a second end of the main link arm may be hingedly coupled to a first end of the first subsidiary link arm.

A first end of the second subsidiary link arm may be hingedly coupled between a point where the main link arm is hingedly coupled to the first end of the first subsidiary link arm, and the first hinge shaft, in such a way as to be spaced apart therefrom by a predetermined interval.

A first end of the third subsidiary link arm may be hingedly coupled to a second end of the first subsidiary link arm about the second hinge shaft, and a second end of the third subsidiary link arm may be hingedly coupled to a second end of the second subsidiary link arm.

Further, the first end of the main link arm may be hingedly coupled to the hinge arm by the first hinge shaft, the second end of the main link arm may be hingedly coupled to the first end of the first subsidiary link arm, the first end of the second subsidiary link arm may be hingedly coupled between the first subsidiary link arm coupled to the main link arm and the first hinge shaft in such a way as to be spaced apart therefrom by a predetermined interval, the first end of the third subsidiary link arm may be hingedly coupled to the second end of the first subsidiary link arm, and the second end of the third subsidiary link arm may be hingedly coupled to the second end of the second subsidiary link arm, thus allowing each of the link arms to be operated relative to an associated hinged coupling portion.

The first end of the actuator may be coupled to the second hinge shaft together with the second end of the first subsidiary link arm and the first end of the third subsidiary link arm, and the second end of the actuator may be coupled between the first end of the second subsidiary link arm and the first hinge shaft in such a way as to be spaced apart therefrom by a predetermined interval.

An elastic member may be provided on the second end of the actuator in such a way that a first end of the elastic member is coupled to a hinged coupling portion on the second end of the actuator and a second end of the elastic member is coupled to the second end of the second subsidiary link arm, the elastic member being broken when the hood pops up.

The actuator may be an explosive type actuator.

As is apparent from the above description, the hood apparatus for the vehicle is advantageous in that it can eliminate the conventional airbag for protecting a pedestrian, thus reducing manufacturing cost, and the hood moves rearwards at the same time as it pops up to an upper position of the vehicle, thus more reliably ensuring the safety of the pedestrian in the event of the vehicle collision. Further, the hood apparatus is advantageous in that the latch structure using the elastic member can be applied, thus preventing noise from being generated due to vibrations while the vehicle is being driven, in addition to preventing the hood from being unexpectedly opened.

The present methods and apparatuses have other features and advantages apparent from the accompanying drawings, incorporated herein, and below Detailed Description, which together serve to explain certain principles of the present invention.

BRIEF DESCRIPTION OF THE DRAWINGS

FIG. 5 shows a length relationship between an actuator and an articulated link of the hood apparatus for the vehicle.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
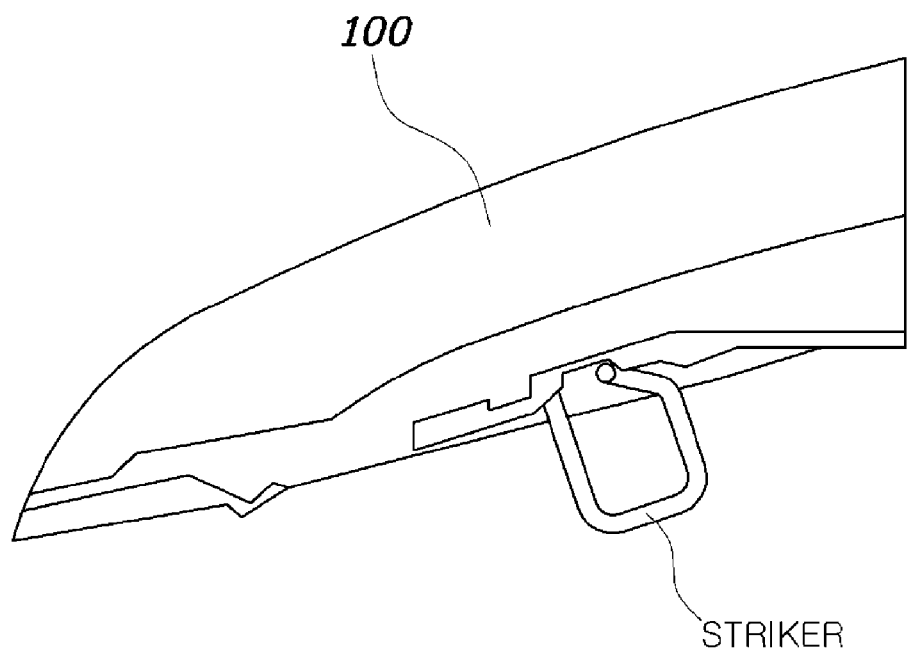
FIG. 1 is a view showing a striker mounted to a hood of a vehicle.
Figure 2:
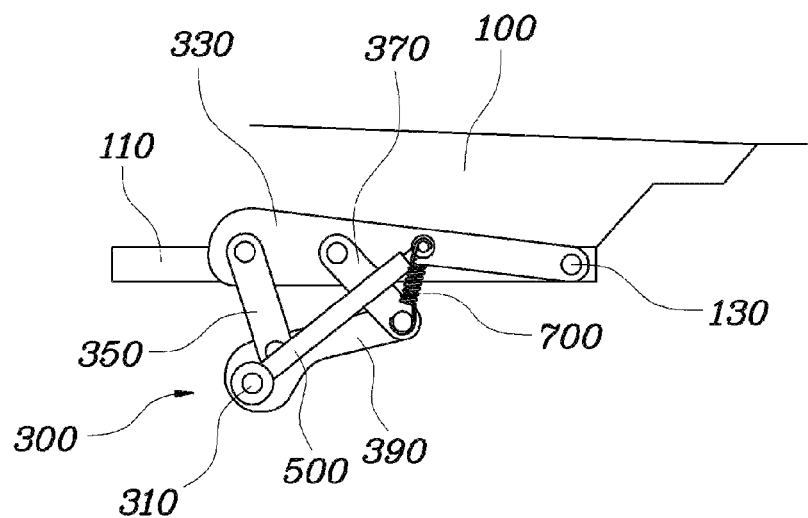
FIG. 2 is a view showing an exemplary state before a hood apparatus for a vehicle according to the present invention pops up.
Figure 3:
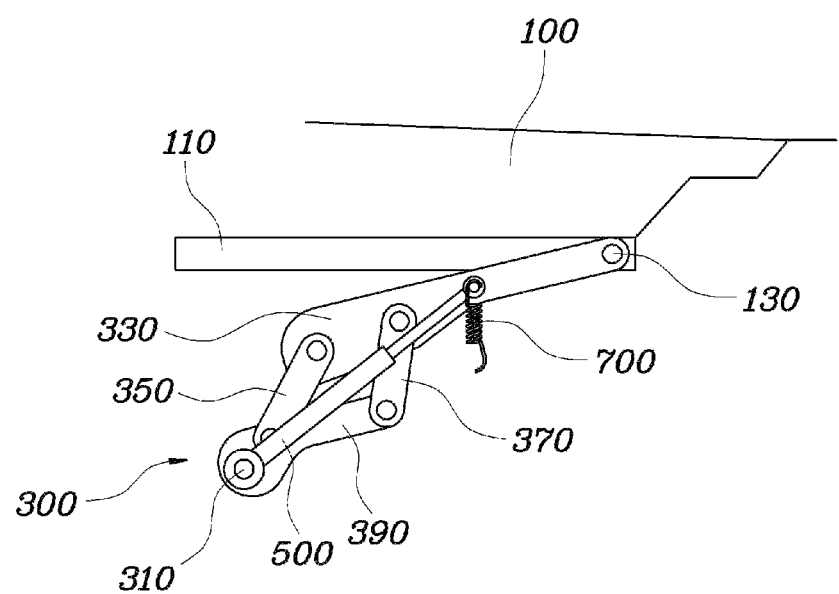
FIG. 3 is a view showing a state after the hood apparatus pops up from the state of FIG. 2.

FIG. 1 is a view showing a striker mounted to a hood of a vehicle, FIG. 2 is a view showing a state before a hood apparatus for a vehicle according to various embodiments of the present invention pops up, FIG. 3 is a view showing a state after the hood apparatus pops up from the state of FIG. 2, FIGS. 4(a), 4(b), and 4(c) are views showing a deployment operation of FIG. 2 in stages, and FIG. 5 shows a length relationship between an actuator 500 and an articulated link 300 of the hood apparatus for the vehicle.

The hood apparatus for the vehicle according to various embodiments of the present invention includes a vehicle hood 100 with which a hinge arm 110 having on a lower end thereof a first hinge shaft 130 is coupled. An articulated link 300 is coupled at a first end thereof to the hinge arm 110 via the first hinge shaft 130, is coupled at a second end thereof to a vehicle body via a second hinge shaft 310, and includes a plurality of joints formed by hingedly coupling a plurality of link arms, thus allowing the link arms to be operated by respective hinge shafts. The actuator 500 is coupled at a first end thereof to the second hinge shaft 310 and coupled at a second end thereof to an associated link arm of the articulated link 300, so that, in the event of a forward collision of the vehicle, the actuator 500 is triggered to allow the hood 100 to pop up. Particularly in various embodiments, the actuator 500 may be an explosive type actuator. Thus, when an accident occurs in front of the vehicle, the actuator 500 is instantaneously operated, so that an explosion is generated within the shortest period of time, thus causing the hood 100 to pop up and securing the safety of a pedestrian.

Particularly, if the hood apparatus for the vehicle according to the present invention detects that a collision occurs in front of the vehicle, the hood 100 pops up to an upper position of the vehicle while simultaneously moves to a rear position of the vehicle. When a collision between a pedestrian and the vehicle occurs, the above configuration prevents the pedestrian from directly colliding with rigid body parts, such as the wiper pivot, the lower portion of the windshield glass, and the sealer matching part of the cowl panel, which should be attached to the front of the vehicle, thus reducing the degree of injury to the pedestrian.

Further, the hood 100 of the vehicle is normally coupled with a striker formed on a lower portion of the hood 100 and a latch formed on an upper portion of the vehicle body, thus preventing the hood 100 from being opened even when the vehicle is being driven. In the event that a forward collision between a pedestrian and the vehicle occurs, his or her lower body may be seriously injured by the striker and the latch that are made of a rigid material.

Therefore, according to the present invention, a lower portion of the striker, that is, a T-shaped portion is increased in length, thus allowing the striker to smoothly slide in the event of a collision and increasing the degree of popping up of the hood 100 upwards from the vehicle body, therefore reducing the degree of injury to the pedestrian.

The hood apparatus of the present invention includes the hood 100, the articulated link 300 and the actuator 500. The articulated link 300 includes four link arms, namely, a plate-shaped main link arm 330, and a first subsidiary link arm 350, a second subsidiary link arm 370 and a third subsidiary link arm 390 which each have a shape of a plate and have a length shorter than that of the main link arm 330. The four link arms are hingedly coupled to each other, thus forming a rectangular shape. Here, hingedly coupled portions form joints. Thereby, an operation is performed with five joints including a hingedly coupled portion between the hinge arm 110 and the main link arm 330.

The coupling relationship between the respective link arms will be described below. The hinge arm 110 is coupled to the main link arm 330. The first end of the main link arm 330 is hingedly coupled to the hinge arm 110 via the first hinge shaft 130, and the second end of the main link arm 330 is hingedly coupled to the first end of the first subsidiary link arm 350.

The first end of the second subsidiary link arm 370 is hingedly coupled between a point where the main link arm 330 is hingedly coupled to the first end of the first subsidiary link arm 350, and the first hinge shaft 130, in such a way as to be spaced apart therefrom by a predetermined interval. The first end of the third subsidiary link arm 390 is hingedly coupled to the second end of the first subsidiary link arm 350 about the second hinge shaft 310, and the second end of the third subsidiary link arm 390 is hingedly coupled to the second end of the second subsidiary link arm 370. As a result, a rectangle is formed and five joints are formed.

That is, the first end of the main link arm 330 is hingedly coupled to the hinge arm 110 by the first hinge shaft 130, the second end of the main link arm 330 is hingedly coupled to the first end of the first subsidiary link arm 350, the first end of the second subsidiary link arm 370 is hingedly coupled between the first subsidiary link arm 350 coupled to the main link arm 330 and the first hinge shaft 130 in such a way as to be spaced apart therefrom by a predetermined interval, the first end of the third subsidiary link arm 390 is hingedly coupled to the second end of the first subsidiary link arm 350, and the second end of the third subsidiary link arm 390 is hingedly coupled to the second end of the second subsidiary link arm 370, thus allowing each of the link arms to be operated relative to an associated hinged coupling portion.

Further, the actuator 500 is coupled to the articulated link 300. The first end of the actuator 500 is coupled to the second hinge shaft 310 together with the second end of the first subsidiary link arm 350 and the first end of the third subsidiary link arm 390, and the second end of the actuator 500 is coupled between the first end of the second subsidiary link arm 370 and the first hinge shaft 130 in such a way as to be spaced apart therefrom by a predetermined interval.

Moreover, an elastic member 700 is provided on the second end of the actuator 500 in such a way that the first end of the elastic member 700 is coupled to a hinged coupling portion on the second end of the actuator 500 and the second end of the elastic member 700 is coupled to the second end of the second subsidiary link arm 370. The elastic member 700 is broken when the hood 100 pops up. The elastic member 700 generally uses a spring or a shear pin to form a latch structure.

In order to prevent the actuator 500 from being unexpectedly exploded by vibrations caused by the driving of the vehicle before the hood 100 pops up, the elastic member 700 more firmly supports the articulated link 300 and the actuator 500, thus preventing the articulated link 300 and the actuator 500 from being undesirably moved. Consequently, the elastic member 700 serves to more firmly support the vehicle body and the hood 100 against vibrations and impacts during the driving of the vehicle.

However, when the hood 100 pops up by the impacts acting on the vehicle, either end of the elastic member 700 is deformed or broken by the explosive force of the actuator 500, and the latch structure is released from the actuator 500 or the second subsidiary link arm 370, thus preventing the elastic member 700 from interrupting the operation of the actuator 500 which serves to pop up the hood 100 to an upper position and a rear position of the vehicle.

Figure 4A:
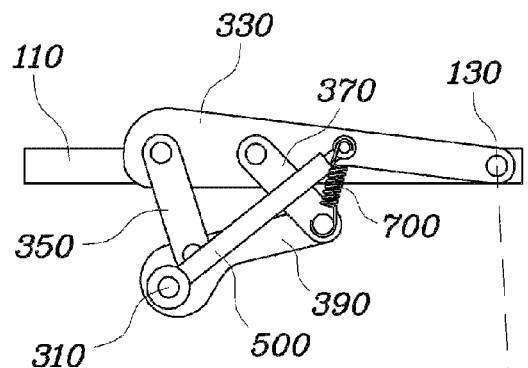
FIGS. 4(a), 4(b) and 4(c) are views showing a deployment operation of FIG. 2 in stages.

The steps of popping up the hood 100 in the event of the vehicle collision are illustrated in FIGS. 4(a), (b) and (c). FIG. 4(a) shows a state before the hood 100 pops up. Referring to FIG. 4(a), the overall length of the articulated link 300, the length of the actuator 500 and the length of the elastic member 700 are reduced to the maximum.

Figure 4B:
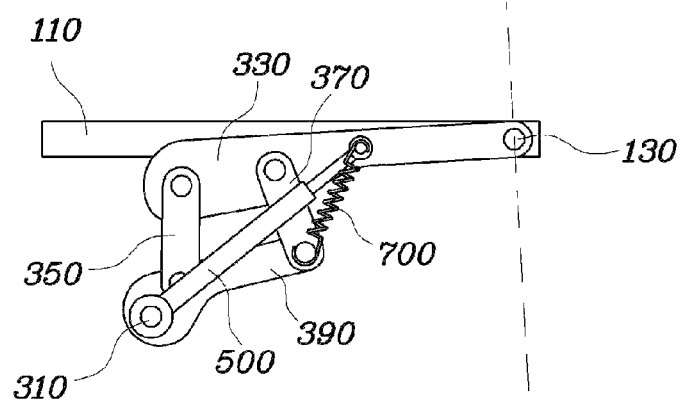
Figure 4C:
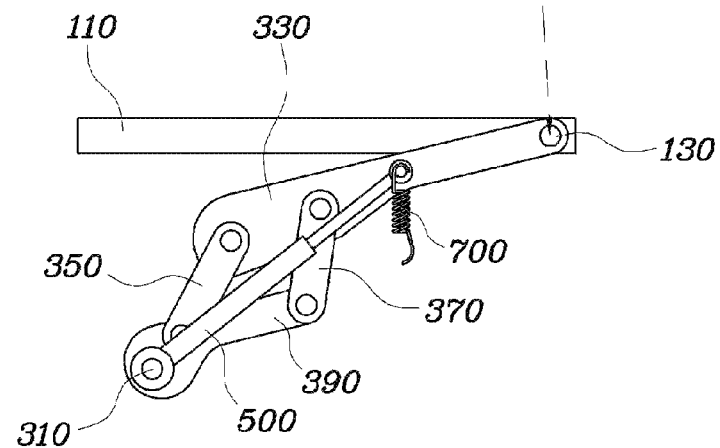

FIG. 4(b) shows a state while the hood 100 is popping up. Referring to FIG. 4(b), each joint of the articulated link 300 is lengthened by the explosion of the actuator 500, and the elastic member 700 is also stretched. Finally, FIG. 4(c) shows a state after the hood 100 has popped up. It can be seen that the actuator 500 and the articulated link 300 are stretched to the maximum. Particularly, the elastic member 700 is broken by the explosive force of the actuator 500.

Finally, FIG. 5 shows a test result of a length relationship between the actuator 500 and the articulated link 300 of the hood apparatus for the vehicle. In FIG. 5, (a) and (b) show a case where only the length of the actuator 500 is increased, and (c) and (d) show upward and downward moving distances of the hood 100 when the length of the actuator 500 is increased, and in addition, when the length of the second subsidiary link arm 370 is reduced.

First, when seen that only the length of the actuator 500 is increased, in (a) of FIG. 5 which shows the state before the hood 100 pops up and in (b) of FIG. 5 which shows the state after the hood 100 pops up, the hood 100 is moved upwards by distance A and is moved rearwards by distance B.

However, when the length of the actuator 500 is increased and simultaneously the length of the second subsidiary link arm 370 is reduced, it can be seen that the hood is not moved upwards but is moved rearwards by distance C.

According to the above-mentioned result, the length of each of the link arms and the actuator is variably tuned depending on the environment or design condition of the vehicle, so that the moving direction and the moving distance of the hood can be designed as desired. In this test, when only the length of the actuator is increased by 40 mm, the distance A of popping up the hood upwards is 35 mm, and the distance B of moving the hood rearwards is 30 mm. Meanwhile, when the length of the actuator is increased by 40 mm and the length of the second subsidiary link arm is reduced by 20 mm, it can be seen that the distance C of moving the hood rearwards is 44 mm.

As described above, the present invention provides a hood apparatus for a vehicle, in which it can eliminate a conventional airbag for protecting a pedestrian, thus reducing manufacturing cost, and a hood moves rearwards at the same time as it pops up to an upper position of the vehicle, thus more reliably ensuring the safety of the pedestrian in the event of a vehicle collision. Further, the hood apparatus is advantageous in that a latch structure using an elastic member can be applied, thus preventing noise from being generated due to vibrations while the vehicle is being driven, in addition to preventing the hood from being unexpectedly opened.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hood apparatus for a vehicle, comprising:
a vehicle hood including a hinge arm with a first hinge shaft on a lower end thereof;
an articulated link coupled at a first end thereof to the hinge arm via the first hinge shaft, and coupled at a second end thereof to a vehicle body via a second hinge shaft, and including a plurality of joints formed by hingedly coupling a plurality of link arms, thus allowing the link arms to be operated by respective hinge shafts; and
an actuator coupled at a first end thereof to the second hinge shaft and coupled at a second end thereof to an associated link arm of the articulated link, so that, in the event of a forward collision of the vehicle, the actuator is triggered to allow the hood to pop up,
wherein, in the event of the collision, the hood pops up to an upper position of the vehicle by the actuator while simultaneously moving to a rear position of the vehicle.

2. The hood apparatus as set forth in claim 1, wherein the articulated link comprises a plate-shaped main link arm, and a first subsidiary link arm, a second subsidiary link arm and a third subsidiary link arm which each have a shape of a plate and have a length shorter than that of the main link arm.

3. The hood apparatus as set forth in claim 2, wherein a first end of the main link arm is hingedly coupled to the hinge arm by the first hinge shaft, and a second end of the main link arm is hingedly coupled to a first end of the first subsidiary link arm.

4. The hood apparatus as set forth in claim 2, wherein a first end of the second subsidiary link arm is hingedly coupled between a point where the main link arm is hingedly coupled to the first end of the first subsidiary link arm, and the first hinge shaft, in such a way as to be spaced apart therefrom at a predetermined interval.

5. The hood apparatus as set forth in claim 2, wherein a first end of the third subsidiary link arm is hingedly coupled to a second end of the first subsidiary link arm about the second hinge shaft, and a second end of the third subsidiary link arm is hingedly coupled to a second end of the second subsidiary link arm.

6. The hood apparatus as set forth in claim 2, wherein a first end of the main link arm is hingedly coupled to the hinge arm by the first hinge shaft, a second end of the main link arm is hingedly coupled to a first end of the first subsidiary link arm, a first end of the second subsidiary link arm is hingedly coupled between the first subsidiary link arm coupled to the main link arm and the first hinge shaft in such a way as to be spaced apart therefrom by a predetermined interval, a first end of the third subsidiary link arm is hingedly coupled to a second end of the first subsidiary link arm, and a second end of the third subsidiary link arm is hingedly coupled to a second end of the second subsidiary link arm, thus allowing each of the link arms to be operated relative to an associated hinged coupling portion.

7. The hood apparatus as set forth in claim 2, wherein the first end of the actuator is coupled to the second hinge shaft together with a second end of the first subsidiary link arm and a first end of the third subsidiary link arm, and the second end of the actuator is coupled between a first end of the second subsidiary link arm and the first hinge shaft in such a way as to be spaced apart therefrom by a predetermined interval.

8. The hood apparatus as set forth in claim 2, wherein an elastic member is provided on the second end of the actuator in such a way that a first end of the elastic member is coupled to a hinged coupling portion on the second end of the actuator and a second end of the elastic member is coupled to a second end of the second subsidiary link arm, the elastic member being broken when the hood pops up.

9. The hood apparatus as set forth in claim 1, wherein the actuator is an explosive type actuator.

10. A hood apparatus for a vehicle, comprising:
a vehicle hood including a hinge arm with a first hinge shaft on a lower end thereof;
an articulated link coupled at a first end thereof to the hinge arm via the first hinge shaft, and coupled at a second end thereof to a vehicle body via a second hinge shaft, and including a plurality of joints formed by hingedly coupling a plurality of link arms, thus allowing the link arms to be operated by respective hinge shafts; and
an actuator coupled at a first end thereof to the second hinge shaft and coupled at a second end thereof to an associated link arm of the articulated link, so that, in the event of a forward collision of the vehicle, the actuator is triggered to allow the hood to pop up,
wherein the articulated link comprises a plate-shaped main link arm, and a first subsidiary link arm, a second subsidiary link arm and a third subsidiary link arm which each have a shape of a plate and have a length shorter than that of the main link arm, and
wherein a first end of the third subsidiary link arm is hingedly coupled to a second end of the first subsidiary link arm about the second hinge shaft, and a second end of the third subsidiary link arm is hingedly coupled to a second end of the second subsidiary link arm.

11. A hood apparatus for a vehicle, comprising:
a vehicle hood including a hinge arm with a first hinge shaft on a lower end thereof;
an articulated link coupled at a first end thereof to the hinge arm via the first hinge shaft, and coupled at a second end thereof to a vehicle body via a second hinge shaft, and including a plurality of joints formed by hingedly coupling a plurality of link arms, thus allowing the link arms to be operated by respective hinge shafts; and
an actuator coupled at a first end thereof to the second hinge shaft and coupled at a second end thereof to an associated link arm of the articulated link, so that, in the event of a forward collision of the vehicle, the actuator is triggered to allow the hood to pop up,
wherein the articulated link comprises a plate-shaped main link arm, and a first subsidiary link arm, a second subsidiary link arm and a third subsidiary link arm which each have a shape of a plate and have a length shorter than that of the main link arm, and
wherein an elastic member is provided on the second end of the actuator in such a way that a first end of the elastic member is coupled to a hinged coupling portion on the second end of the actuator and a second end of the elastic member is coupled to a second end of the second subsidiary link arm, the elastic member being broken when the hood pops up.

\* \* \* \* \*